(12) United States Patent
Cowan et al.

(10) Patent No.: US 7,460,303 B2
(45) Date of Patent: Dec. 2, 2008

(54) DIRECTIONAL DIFFUSER

(75) Inventors: James Cowan, Lexington, MA (US); Kenneth A. Haines, Soquel, CA (US)

(73) Assignee: Aztec Systems, Inc., Lexington, MA (US)

( * ) Notice: Subject to any disclaimer, the term of this patent is extended or adjusted under 35 U.S.C. 154(b) by 0 days.

(21) Appl. No.: 11/828,531

(22) Filed: Jul. 26, 2007

(65) Prior Publication Data

US 2008/0013180 A1   Jan. 17, 2008

Related U.S. Application Data

(60) Continuation of application No. 11/099,774, filed on Apr. 6, 2005, now abandoned, which is a division of application No. 10/639,552, filed on Aug. 12, 2003, now Pat. No. 6,940,665, which is a division of application No. 09/920,060, filed on Aug. 1, 2001, now Pat. No. 6,608,722.

(60) Provisional application No. 60/222,182, filed on Aug. 1, 2000.

(51) Int. Cl.
*G02B 5/02* (2006.01)
*G02B 13/20* (2006.01)

(52) U.S. Cl. ............................ 359/599; 359/900
(58) Field of Classification Search ............ 359/1, 359/571, 572, 599, 900
See application file for complete search history.

(56) References Cited

U.S. PATENT DOCUMENTS

| 3,718,078 A | 2/1973 | Plummer ..................... 95/49 |
| 3,834,786 A | 9/1974 | Carlsen ..................... 350/3.5 |
| 4,298,249 A | 11/1981 | Gloor et al. ................ 350/338 |
| 4,402,571 A | 9/1983 | Cowan et al. |
| 4,888,260 A | 12/1989 | Cowan ........................ 430/1 |
| 5,004,673 A | 4/1991 | Vlannes ..................... 430/325 |
| 5,600,462 A | 2/1997 | Suzuki et al. .............. 349/112 |
| 5,631,754 A | 5/1997 | Jannson et al. ............... 349/64 |
| 5,771,328 A | 6/1998 | Wortman et al. ........... 385/146 |
| 6,024,455 A | 2/2000 | O'Neill et al. .............. 359/530 |

(Continued)

FOREIGN PATENT DOCUMENTS

EP   0 332 790 B1   11/1994

(Continued)

OTHER PUBLICATIONS

Communication from the European Patent Office for EP 01 957 588.5, mailed Oct. 11, 2007.

(Continued)

*Primary Examiner*—Alessandro Amari
(74) *Attorney, Agent, or Firm*—Mintz, Levin, Cohn, Ferris, Glovsky and Popeo, P.C.

(57) ABSTRACT

A diffuser is disclosed which transmits or reflects incident light into a specific range of angles. In a preferred embodiment, this light is uniformly scattered throughout a cone of angles. The diffuser consists of two parts. The first part diffracts or reflects light into a specific offset angle. The second part, in the preferred embodiment, uniformly scatters the light through a range of angles, which is centered on the offset angle. The diffusers have utility in applications such as screens for wrist watches, computers, calculators, and cell phones.

3 Claims, 8 Drawing Sheets

U.S. PATENT DOCUMENTS

| | | | |
|---|---|---|---|
| 6,076,933 A | 6/2000 | DiLoreto et al. | 359/614 |
| 6,081,376 A | 6/2000 | Hansen et al. | 359/485 |
| 6,285,503 B1 * | 9/2001 | Chao et al. | 359/569 |
| 6,331,915 B1 | 12/2001 | Myers | 359/599 |
| 6,348,995 B1 | 2/2002 | Hansen et al. | 359/486 |
| 6,400,509 B1 | 6/2002 | Sappey et al. | 359/571 |
| 6,410,213 B1 | 6/2002 | Raguin et al. | 430/321 |
| 6,509,982 B2 * | 1/2003 | Steiner | 359/15 |
| 6,608,722 B2 | 8/2003 | Cowan et al. | 359/599 |
| 6,940,665 B2 | 9/2005 | Cowan et al. | 359/900 |
| 7,221,512 B2 | 5/2007 | Steenblik et al. | 359/569 |
| 2002/0090578 A1 | 7/2002 | Schaefera et al. | 430/320 |

FOREIGN PATENT DOCUMENTS

| | | |
|---|---|---|
| WO | WO 95/04303 | 2/1995 |
| WO | WO 01/04697 A1 | 1/2001 |
| WO | WO 2005/115119 A2 | 12/2005 |

OTHER PUBLICATIONS

International Search Report for PCT/US01/41559, mailed Jan. 22, 2003.

* cited by examiner

DIRECTIONAL DIFFUSER

RELATED APPLICATIONS

This application is a continuation of U.S. patent application Ser. No. 11/099,774, filed Apr. 6, 2005, now abandoned which is a divisional application of U.S. Ser. No. 10/639,552, filed Aug. 12, 2003, now U.S. Pat. No. 6,940,665 which is a divisional application of U.S. Ser. No. 09/920,060, filed Aug. 1, 2001 (now U.S. Pat. No. 6,608,722), which claims priority to U.S. Ser. No. 60/222,182, filed on Aug. 1, 2000, both of which are incorporated herein by reference.

FIELD OF THE INVENTION

The present invention relates generally to an optical diffuser and method for making the same, and more particularly to an optical diffuser having a high diffraction efficiency, broadband response and cost effective method of producing the same.

BACKGROUND

Reflective diffusers are required for many applications, including liquid crystal displays, to enhance their viewability. Often these diffusers, placed behind the liquid crystal element, are simply roughened reflective surfaces. These reflectors utilize no back lighting, but instead rely on the scattered reflection of the ambient light. Unfortunately, light scattered from these devices is centered around the glare angle, which is in direct line-of-sight with the undesirable reflections from their front surface. Furthermore in many applications, such as computer screens, and perhaps watches, the preferred orientation of the device is one for which viewing at the glare angle is not optimum. The situation can be improved by using holographic diffusers which allow the reflection angles of interest to be offset, so that the maximum brightness from the diffuser falls in a preferred viewing angle which is different from that of the glare. One type of holographic diffuser that is sometimes used is the reflective, "surface-relief" hologram. This hologram has the advantage over other types in that if the ambient light is white, the reflected diffuse light is also white. Another advantage of the surface-relief hologram is that embossing can reproduce it easily and inexpensively. A major disadvantage is that the surface-relief hologram can be inefficient. Only a relatively small percentage of the incident light is diffracted into the desired viewing angles (typically less than 30 degrees).

A non-holographic diffuser, when coupled with a reflective focusing screen, uses randomly sized and randomly placed minute granules, which are created by interaction of solvent particles on plastic surfaces (See U.S. Pat. No. 3,718,078, entitled, "Smoothly Granulated Optical Surface and Method for Making Same"). These granules are dimples of extremely small magnitude (one half of a micron in depth), which reflect incident light more or less uniformly over a restricted angle. However, the angles of reflectance are very small, usually about + or −3 degrees, and the light reflected from them is here again at the glare angle.

A second kind of off-axis, holographic diffuser in common use today is the volume reflection diffuser, which can be provided by Polaroid Corporation of Cambridge Mass. With volume holograms, fringes that give rise to the diffuser reflection are distributed throughout the volume of the material, unlike the surface reflection concept of the "surface-relief" holograms. Because of this, light of a wavelength that is characteristic of the spacing distance between the fringe planes is resonantly enhanced over all other wavelengths. Thus, the reflected light is highly monochromatic. For example, if the spacing is characteristic of green, then green will be the predominant reflected color for incident white light. Unlike conventional embossed holographic diffusers, the reflection can be extremely efficient, although only over a narrow wavelength band. As a result, the surface-relief hologram can appear dim because most of the incident white light falls outside of this select band. Further processing can increase the bandwidth, thus increasing the apparent brightness, but the resulting diffuser still has a predominant hue, which is in most cases undesirable. In any event the bandwidth is still somewhat restricted, thus limiting the reflection efficiency.

Therefore, an unsolved need has remained for a diffuser having a high diffraction efficiency, broadband response and cost effective manufacture, which overcomes limitations of the prior art.

SUMMARY OF THE INVENTION

In an embodiment of the present invention as set forth herein is a blazed diffuser, which includes a reflective surface having a sawtooth structure. The sawtooth structure includes a series of contiguous wedges, each of which reflects incident oblique light into a beam which is more or less normal to the gross surface of the device. This wedge structure may be regarded as simply an off-axis mirror if the wedge spacing (period) is much larger than the wavelength. Superimposed on this wedge surface is a second structural component, which by itself diffracts incident light normal to its surface into rays, which constitute only those over a restricted narrow angle (e.g. + or −15 degrees). This angle is specified as that which is desired for a particular application. In an embodiment, this second surface shape is one that uniformly scatters an incident ray throughout the viewing angle. Such a structure gives a so called "flat top" scattering. When these two structures are superimposed, light incident from a predetermined angle which is dependent on the wedge angle, is uniformly scattered throughout a specified range of viewing angles with a high degree of efficiency. Almost all incident light is utilized and efficiencies approaching 100% for all visible wavelengths are possible.

In another embodiment, a blazed diffuser is made entirely by optical, holographic means, and it can be fabricated in such a way that the broadband spectral colors are properly mixed so that the diffracted light appears white. The recording for this diffuser is done in two primary ways. The first is by recording directly from a predetermined diffuse surface, and the second is by copying from a volume diffuser into a surface diffuser.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

The present invention provides an improved diffuser having a high diffraction efficiency, broadband response and method for making the same.

Figure 1A:
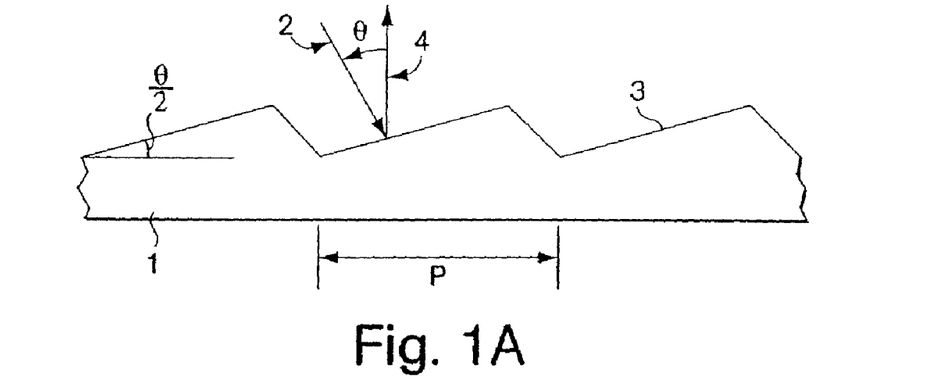
FIGS. 1A, 1B and 1C show a number of embodiments of the diffuser in accordance with principles of the present invention.

Referring to FIG. 1A, an embodiment of the present invention as set forth herein comprises an improved diffuser including a reflective surface. The reflective surface may include a periodic wedge structure 1, as shown in FIG. 1A, which reflects incident light 2 so that incident light 2 impinges on its surface 3 from an oblique angle, θ, into rays 4 which are approximately normal to its surface. These reflected rays 4 are contained within a small angular spread if the period p of the wedge is much greater than the wavelength of the light, λ. It is essential that the wedge angle (θ/2) for the surface 3 in FIG. 1A, be selected for the particular application (e.g. θ/2=15°) and that the period p be large compared to the wavelength (typically p>100λ). However, a period that is too large (>100 microns for example) may be visually annoying. If p is not much larger than λ, then incident light is scattered over other angles than that normal to the surface, as predicted by diffraction analysis. Furthermore the angle of scattering is then wavelength dependent, a feature that tends to detract from a desirable white diffusion pattern.

Figure 1B:
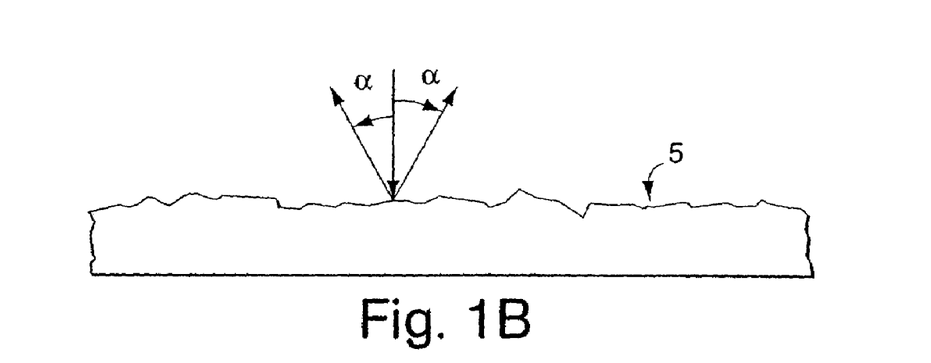
Figure 1C:
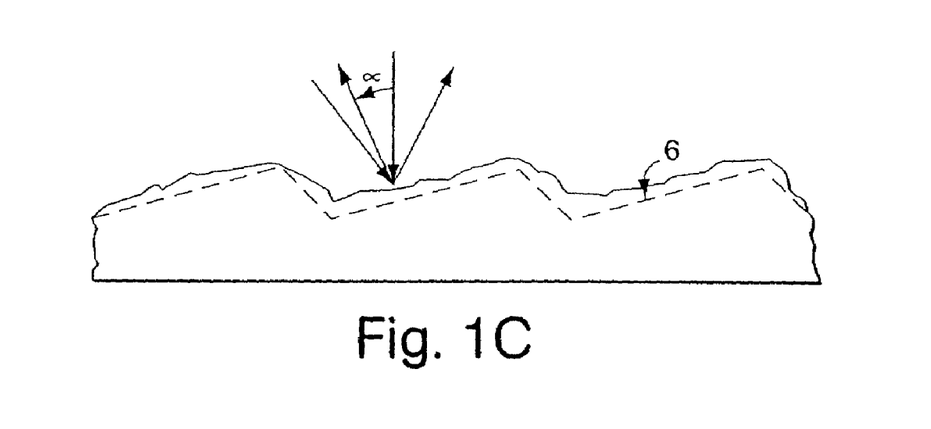

Referring further to FIG. 1B, the diffuser further includes a second structure 5, which is disposed on the reflective surface. The second structure uniformly reflects incident rays across a prescribed angle, α. The surface 6, which is shown in FIG. 1C, accepts an incoming oblique beam and scatters it uniformly over a range of angles, α. The scattered beam is centered on the normal to the structure with high efficiency. The geometry of the second structure 5-or scattering structure, may itself be periodic with period q, which is smaller than, equal to, or slightly larger than the wedge period p. Such examples of these structures are shown in FIG. 2.

There are a variety of surface shapes that may be used for these structures. In the present embodiment, a shape for an element of the resulting combined surface can be described by the simple equation:

$$s(x) = ax^2 + bx, \quad (1)$$

where $s(x)$ is the height of the surface and x is the coordinate on the surface, and an element is defined to span only one peak of the structure as is shown by the dimension q in FIG. 2. The second term of equation 1 represents the tilted flat surface on wedge 3. The first term is that of a quadratic, or parabolic reflector, either positive or negative.

Simple microlens arrays may be approximated by periodic, two-dimensional parabolic surface arrays and as such have been used successfully to create flat top diffraction patterns, i.e., uniform on-axis reflection (or transmission) over a specific range of angles. Theoretically, a plane wave of incident light is uniformly reflected from a periodic surface throughout a specific range of angles because it has a constant second derivative.

In general, the diffraction from any reflective phase surface element, $s(x)$, can include:

$$f(\gamma) \approx (1/q) \int_{-q/2}^{q/2} \exp[2is(x)k] \exp[-ikx\gamma] dx \quad (2)$$

where γ is the reflection angle (radians), and k=2π/λ. For example, inserting for $s(x)$ the parabolic function of equation 1, minus the wedge (sawtooth) portion, equation 2 yields $$f(\gamma) \sim \exp[ik\gamma^2/8a] \int_{t_1}^{t_2} \exp(-i\pi t^2/2) dt \quad (3)$$

where $$t_1 = -\sqrt{2a/\lambda}\, q + \sqrt{1/2a\lambda}\, \gamma$$

and $$t_2 = +\sqrt{2a/\lambda}\, q + \sqrt{1/2a\lambda}\, \gamma$$

The integral in equation 3 is known as the Fresnel integral.

Figure 2A:
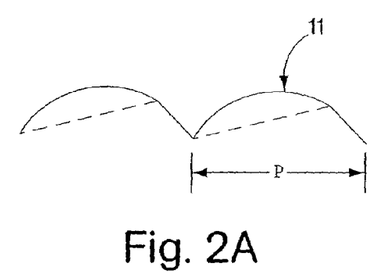
FIGS. 2A, 2B, 2C, 2D, 2E, 2F and 2G show a number of embodiments of reflective surfaces associated with the embodiments of the diffuser shown in FIGS. 1A, 1B and 1C.
Figure 2B:
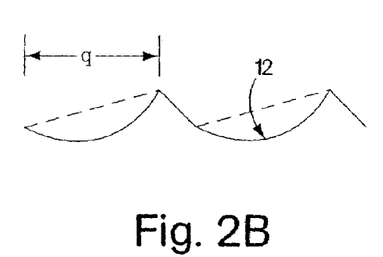
Figure 2C:
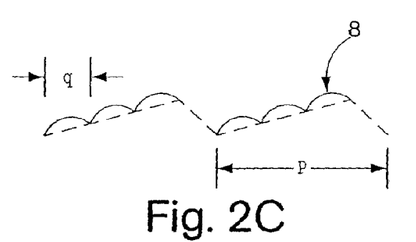
Figure 3:
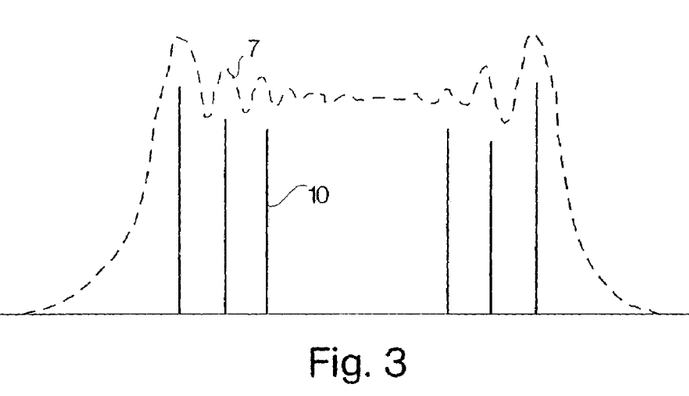
FIG. 3 shows the flat top diffraction profile of the surface of FIG. 2E.

A typical plot of the amplitudes of the diffraction function of equation 3, is shown as the dashed curve 7 of FIG. 3. Such curves are derived by data plotted in comu spirals, which are a convenient representation of these Fresnel integrals. As the size q of the element increases, the undulations evident at the extreme angles are reduced and the curve approaches the flat top distribution, which is desired for a preferred embodiment. However, this second component of the diffuser structure is periodic, the periodicity of which is q. For a periodic structure, the angular reflection distribution is punctuated by distinct peaks, the distance between which is proportional to the wavelength, λ, but is inversely proportional to the element size q. These peaks, which represent the various orders diffracted by the structure, are centered on the solid lines 10 shown in FIG. 3. The presence of these periodic peaks need not be detrimental to the diffuser visibility if the period q is large compared to the wavelength, in which case they will be very close together, or if the incident light is specularly broad or spatially diffuse, thus obscuring them. For the examples in FIGS. 2A and 2B, the elements 11 and 12 are as large as that of the sawtooth, i.e., q=p, which is an extreme, and perhaps a desirable case, because it also reduces the undulations in the envelope (the dashed curve) as discussed before.

Figure 2D:
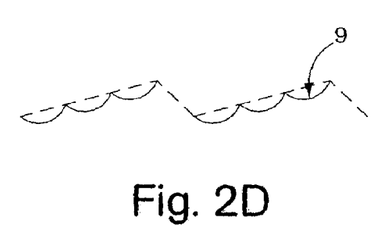

For parabolic structures, the diffraction function for elements 9 and 12, shown in FIGS. 2B and 2D, is slightly different than that represented by equation 3 due to the inverted parabolic function. The applicable equation for that surface is $$f'(\gamma) \sim \exp[ik\gamma^2 8a] \int_{t_3}^{t_4} \exp(-i\pi t^2/2)dt \quad (4)$$

where $$t_3 = -\sqrt{2a/\lambda}\, q + \sqrt{1/2a\lambda}\, \gamma$$

and $$t_4 = +\sqrt{2a/\lambda}\, q + \sqrt{1/2a\lambda}\, \gamma$$

The function f' is the complex conjugate of f (i.e., f'=f*), a result that is evident from Fourier analysis, and so the amplitude of f' is also represented by the dashed curve 7 of FIG. 3. Here again, a periodic structure as shown in FIG. 2D, results in peaks represented by the solid lines 10.

Figure 2E:
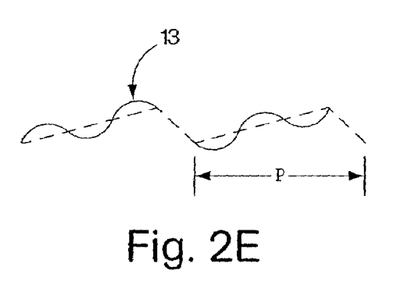
Figure 2F:
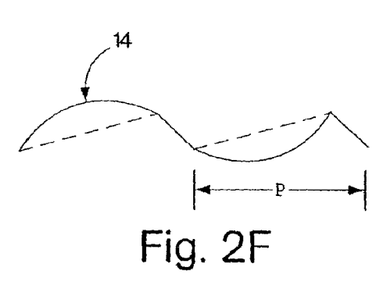

The structures 13 and 14 shown in FIGS. 2E and 2F combine the elements described by equation 3 and equation 4. After addition of suitable requisite phase terms (to account for lateral shifts and pedestal phase functions), these surface components, in the absence of the sawtooth component, give diffraction functions $f(\gamma)$ $$f(\gamma) \sim \Re e\{\exp[ik\gamma/2 + ika^2/2]f(\gamma)\} \quad (5)$$

where the symbol $\Re e$ refers to the 'real part'.

Because of the additional phase terms in equation 5, the dashed curve 10 of FIG. 3 represents the maximum diffraction that is achieved. Furthermore, peaks occur in this curve at half the distance of those for the cases discussed so far, since the period of this combined structure is now 2q versus q previously.

Figure 2G:
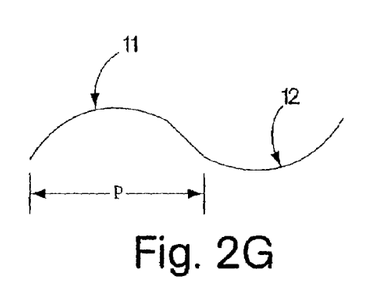

The surface shown in FIG. 2G is particularly interesting. Each element of FIG. 2A alternates with its inversion shown in FIG. 2B to produce a surface without discontinuities. Each element of width P, is an offset parabola when equation (1) is applied.

Figure 4:
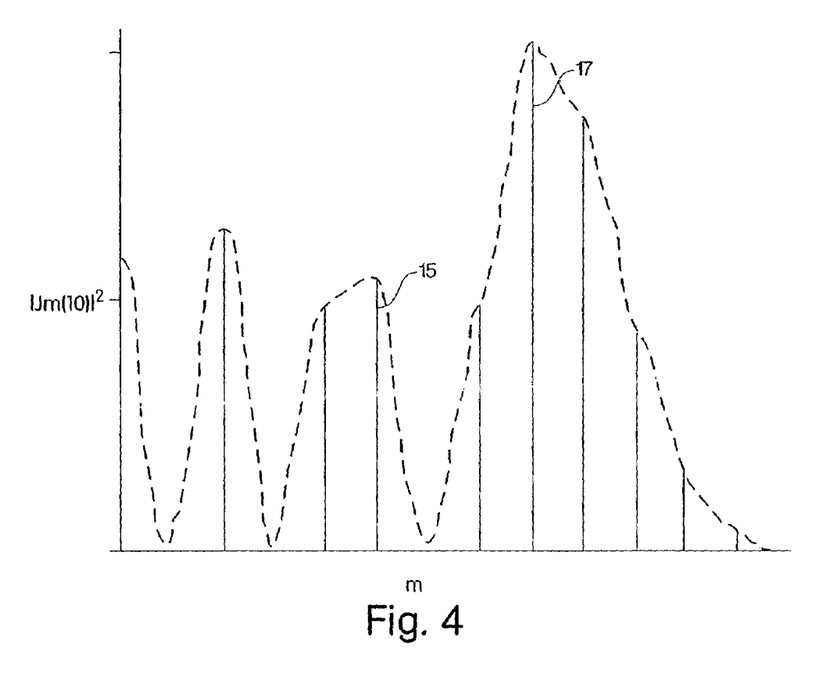
FIG. 4 shows the diffraction profile of a surface which approximates that of FIG. 2E.

A surface which approximates the undulating parabolic surface of FIG. 2E (disregarding the sawtooth or wedge) is that which is represented by a sine or cosine function. Such a function can be constructed from the surface relief etching of two interfering, coherent beams. A function describing such a surface can include:

$$s(x) \approx c \sin(\pi x/q) \quad (6)$$

where 2c is the peak-to-peak excursion of the function, which is periodic in 2q. Inserting this function into equation 2 results in the diffraction function $$f(\gamma) \approx \int_{-q}^{q} \exp\cdot[2ikc\sin(\pi x/q)]\exp\cdot[-ikx\gamma]dx \quad (7)$$

whose solution is $$f(\gamma_m) \sim J_m(2kc) \quad (8)$$

where $J_m$ is the $m^{th}$ order Bessel function of the first kind, m is an integer, and $f(\gamma_m)$ represents the amplitude of the diffracted (or reflected) beams at the discrete angles of $\gamma = m\lambda/p$. In FIG. 4, discrete values of $|f(\gamma_m)|^2$, for example 15 and 17, are plotted for the case in which the period 2q equals 38 λ, and the angular spread is approximately ±15 degrees. As can be seen in FIG. 4, the profile 16 is not flat-topped, but peaks at specific angles (17 in FIG. 4). Such peaks tend to be reduced as the period, 2q, increases with respect to the wavelength, and a reasonable approximation to a flat top angular distribution is obtained.

Another method of producing a parabolic surface structure holographically is by the coherent interference of three laser beams in a layer of photoresist. If the sources of expanded light from each of the beams are arranged such that each source is approximately at the apex of an equilateral triangle, then the developed pattern in the photoresist will consist of a close-packed honeycomb array. By using suitable nonlinear etching characteristics of the photoresist, each honeycomb depression will develop in the shape of a paraboloid.

While the specific examples discussed so far relate to the reflection of incident light from a surface in air (i.e., n=1), the analysis also applies to cases in which the light is reflected from a surface that is covered, for example, by a plastic overcoating. In an embodiment, a reflective diffuser is provided, which includes a reflective surface that is embossed into the underside of a plastic sheet. In this embodiment, slight modifications to the analysis must be made, mainly in an alteration of the depth of the structure. (In equation 2, for example, s(x) becomes n s(x), where n is the index of refraction of the plastic). Also certain modifications would enable these devices to be used as transmission diffusers, rather than reflection diffusers.

Construction of surfaces discussed herein, and examples of which are shown in FIG. 1, may be carried out by a number of processes. For well defined periodic functions like those shown in FIG. 1, the surfaces can be formed by micro-machining or laser etching (e.g., MEMS processes). Alternatively the surfaces can be formed in two separate steps, which includes a first step that produces a periodic sawtooth structure such as that shown in FIG. 1A. Such a strictly periodic structure can, for example, be machined with great precision and cast into a number of materials. A second step, which adds the diffusion, or second component, may be added, for example in the following way. After appropriately coating the periodic sawtooth structure with a photoresist layer, the diffusing structure may be created by exposure to appropriate optical patterns and suitable processing of the photoresist thereafter. These optical patterns may be generated as an interference pattern of a number of coherent beams (the sine wave for example), the three-beam honeycomb pattern as described above, or as a result of scanning the photoresist surface with a focused intensity modulated light beam (as with a laser). Alternatively the optical pattern to which the photoresist is exposed may be a random function resulting, for example, from a laser illuminated diffuser. Randomly diffuse functions whose angular diffraction envelope are flat-topped, are usually difficult to create, unless unique processes are used.

The randomness may be achieved for example by using small portions of the prerequisite parabolic surface, which are randomly positioned but which on the aggregate cause reflected light to be more or less uniformly reflected over the desired angle.

Figure 5:
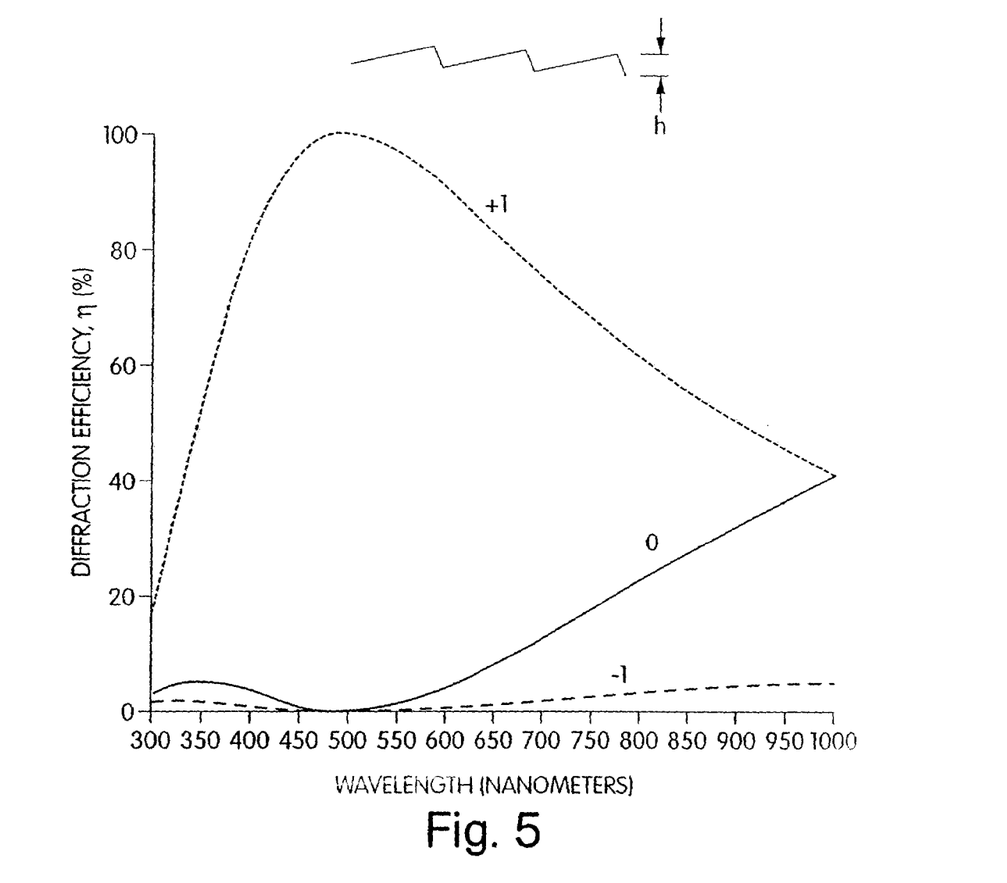
FIG. 5 shows the efficiency of light reflected for the structure of a preferred embodiment.
Figure 6:
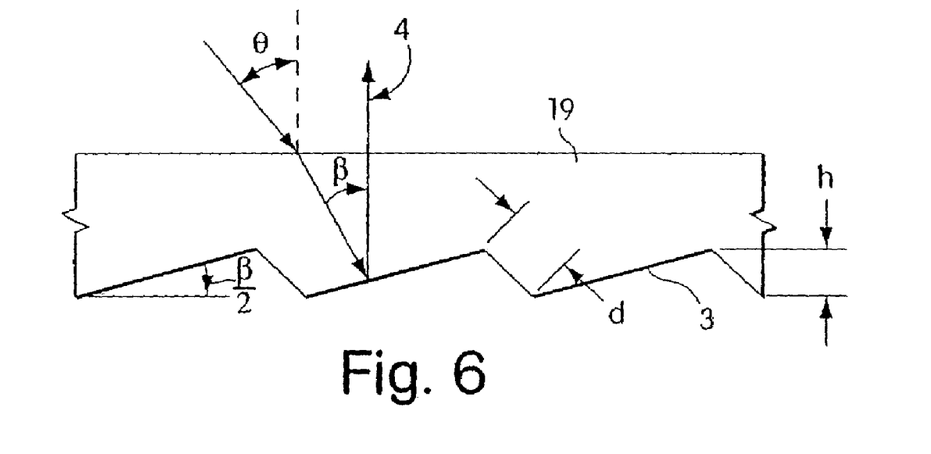
FIG. 6 shows light rays passing into and out the diffuser shown in FIG. 1A.

Another process, described in the following, is a direct holographic method. The structure created by this method is different than that discussed so far, in that the period p is of the same order as the wavelength, λ, and thus diffraction effects become important. FIG. 5 illustrates the results of scalar diffraction theory, in which curve 18 is the major diffracted order, and the diffraction efficiency approaches 100% for the wavelength of interest. The step height h for the case shown in the FIG. 6 is equal to half the peak wavelength. For a central wavelength peak of 500 nm, the step height is thus 250 nm. This efficiency curve assumes that the surface is an ideal reflector, providing 100% efficiency at the peak wavelength. The efficiencies are also high for the entire visible spectral range, roughly ranging from approximately 85% at 400 nm in the violet to approximately 75% at 700 nm in the deep red. For this reason 500 nm is generally chosen to represent the center of the visible spectrum, and the surface structure is designed to operate at this wavelength. Note that there is a significant difference between the small scale structure represented by curve 18, and the diffraction (or reflection) from the surface 3 of FIG. 1A. In FIG. 1A, the step height is many wavelengths, resulting in a diffraction efficiency of close to 100% for all visible wavelengths.

The parameters of FIG. 5 are chosen for the case of an air interface bordering the reflective sawtooth surface, similar to the situation shown in FIG. 1A. In the actual case, as with the situation of FIG. 1A, a preferable configuration is the coating of the surface with a protective layer, usually a clear plastic material 19 having an index of refraction, n=1.5, as in FIG. 6. The tilt angle of the sawtooth 3 is chosen to provide an optimum viewing angle normal to the surface when light is incident at the proper offset angle, which for illustrative purposes can be 30 degrees. The wedge angle, $\beta/2$, can be selected for the overcoated surface as shown in FIG. 6. Snell's Law, $\sin \theta = n \sin \beta$, for light passing from air with index 1 into a medium with index n, yields, for an entrance angle from air of $\theta=30$ degrees, an exit angle of $\beta=19.47$ degrees within the n=1.5 surface. The wedge tilt angle is half this value, or 19.47/2=9.74 degrees. The revised step height is h=250/n=250/1.5=166.67 nm. The period p is calculated from the grating equation for normal incidence, $\lambda=p \sin \theta$, or $p=500/\sin 30°=500/(1.5 \sin 19.47°)=1000$ nm=1.0 micron.

Figure 7:
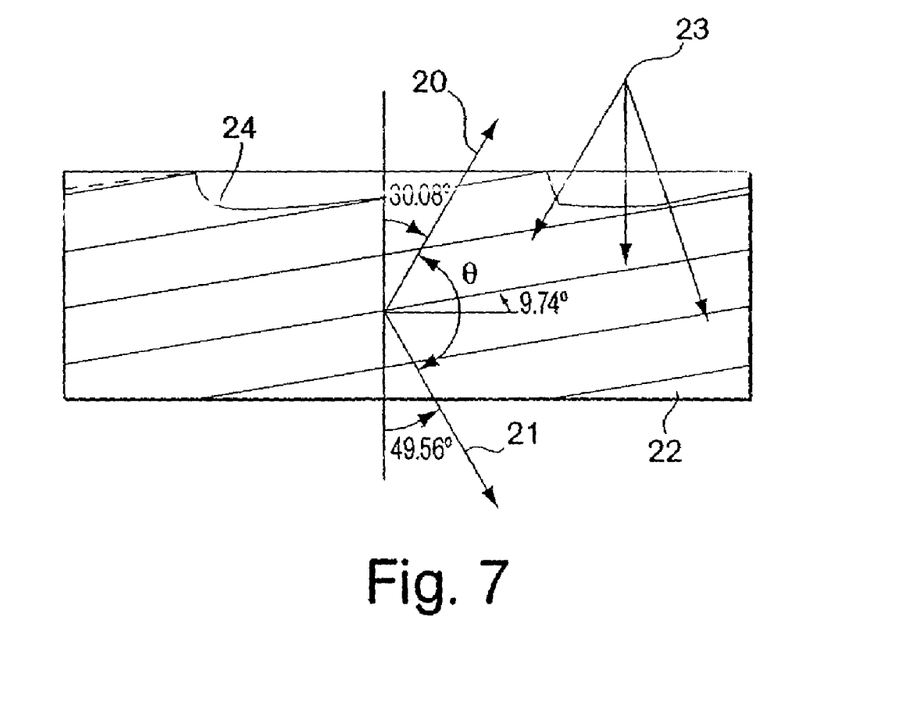
FIG. 7 shows interference fringe planes and the etched surface in photoresist of an embodiment of the diffuser.

One method of creating the periodic wedge is by recording the interference of two counterpropagating laser beams, 20 and 21 in FIG. 7, in a material 22 such as photoresist (n=1.7). The equation for spacing between the interference planes, d, can include:

$$d=\lambda_o/[2n \sin (\theta_0/2)] \qquad (9)$$

where $\theta_o$ is the half angle between the beams, and $\theta_o$ is the laser recording wavelength. Thus the sine of the half angle is calculated in accordance with the following:

$$\sin (\theta_o/2)=\lambda_o/(2nd)=441.6/[(2)(1.7)(169.11)=0.76803 \qquad (10)$$

where a recording wavelength of $\lambda_o=441.6$ nm from a He—Cd laser and an index of refraction of n=1.7 for photoresist have been used. The spacing, d, has been calculated as $$d=h/[\cos(\beta/2)=166.67/[\cos(9.74°)=169.11 \text{ nm} \qquad (11)$$

Thus equation 10 yields an angle between the beams of $\theta_o=100.36°$. The interference fringe structure, 23, is shown in FIG. 7. This structure represents, after exposure, planes of maxima and minima of exposure intensity. When the photoresist plate is immersed in developer, etching or removal of the exposed photoresist proceeds from the top surface layer downward, the most exposed layers being removed preferentially over the least exposed layers. Ideally, the developer reaches the first zero exposure plane, which is represented by the dotted line 24 in FIG. 7. The fringe planes lying beneath this plane are not affected by the development.

The preceding discussion represents the types of calculations that must be made in order to accurately form the fringe planes, and thus the sawtooth structure in a photoresist material, which is ultimately used as a master copy for mass production. In an embodiment, at least one of the beams, 20 and 21, in FIG. 7, can have some variation so as to create the desirable angular diffusion.

If there were no diffuse component to the beam, then the light diffracted from the sawtooth surface relief structure would, for incident white light, display all the spectral colors from violet to red, although each would be viewable from a different angle. But controlled diffusion is a requirement of this technology. Adding a diffuse component to obtain white light means adding a variation in the grating period p or in the slope of the sawtooth, so that all colors are mixed at the same diffraction angle. For example, taking the extremes of 400 nm for violet and 700 nm for red, the period p for these two colors is, respectively, p=400/sin 30°=800 nm (violet) and p=700/sin 30°=1400 nm (red) for the same diffraction angle of 30 degrees. If these extremes in the period for the visible spectrum are now present as part of the surface relief structure, then the diffraction angles for the design wavelength of 500 nm range from 38.68 degrees to 20.92 degrees, so that the total variation is 8.68+9.08=17.76 degrees. Since the diffuser is nominally designed to operate at an angular spread of plus or minus 15 degrees from the main diffraction angle of 30 degrees (or a total angular spread of 30 degrees), there is sufficient angular variation for mixing the entire visible spectrum sufficiently to produce white light.

Figure 8:
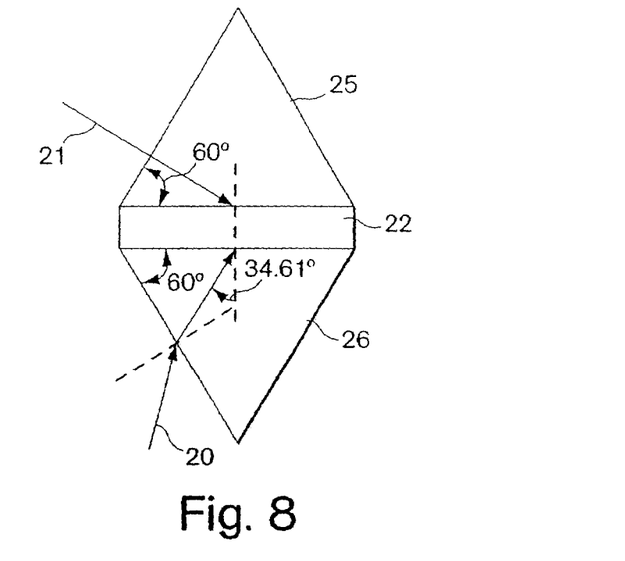
FIG. 8 shows a recording configuration of an embodiment of the diffuser that uses prism coupling.

A method for making the diffuse structure is to use a split beam holographic setup and a predetermined diffuse surface. This method allows for flexibility in the range of recording angles. The method does, however, require the fabrication of a diffuse plate with the requisite viewing angles, which is inserted into at least one of the two recording beams. In one configuration, as shown in FIG. 8, requires the use of two prisms, 25 and 26, with a liquid gate plate holder contacted by index matching liquid to both prisms. The calculated angles for beam 20 with respect to the normal, i.e., 49.56 degrees, is so large that it exceeds the critical angle, $\theta_c$, which is $\theta_c=\arcsin (1/n)=\arcsin (1/1.7)=36.03$ degrees. In the absence of a coupling medium, i.e., an air interface, all incident light would be at almost normal incidence to the face of the equilateral prism 25. Beam 20 enters the face of the opposite prism 26 such that the angle of incidence to the photoresist material 22 from the n=1.5 glass layer is equal to 34.61 degrees. In this case the fringe spacing and tilt angle in the photoresist are as required for the example above. Because the angle of incidence of beam 20 does not exceed the critical angle into photoresist, an alternative scheme allows beam 20 to enter the tank directly from air at 58.43 degrees, A third alternative is one in which the rectangular plate holder tank is immersed in a large square tank filled completely with index matching liquid, thus eliminating the prisms altogether. While this latter method is relatively easy to implement it does require great care in allowing the index matching liquid to completely stabilize before making the recording.

Copying directly from a volume diffuser, as an alternative to the above, has many advantages. One advantage relates to a volume diffuser with the requisite offset and viewing angles, which can be efficiently produced holographically. Another advantage relates to the copying procedure, which is simpler than direct recording using a predetermined diffuse master, provided certain conditions are met. One of these conditions is that the peak wavelength of light diffracted from the master falls roughly into the center of the visible spectral range. Also the volume diffuser, which is used for copying, can have the proper angular spread to create an adequate viewing angle in the reflective mode.

Figure 9:
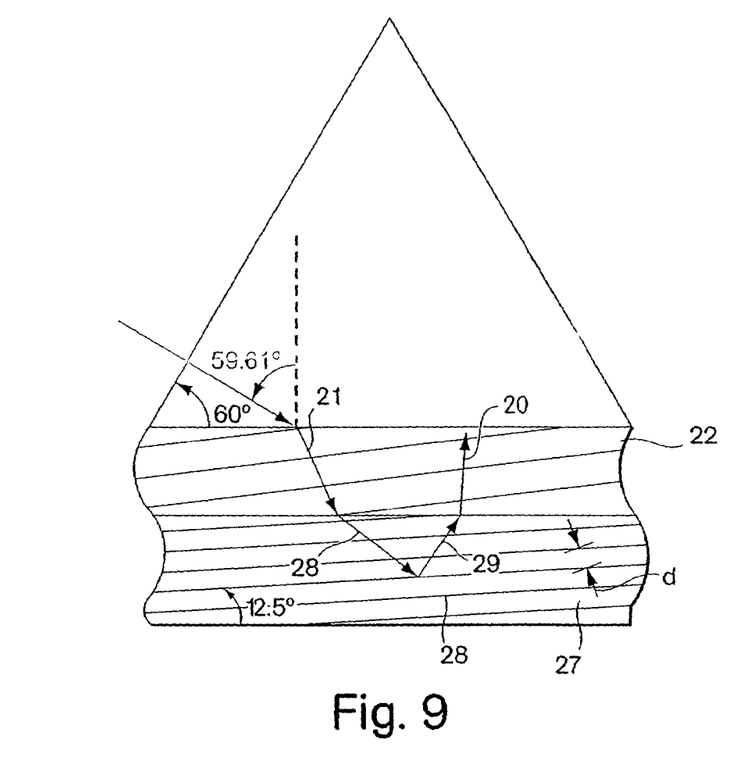
FIG. 9 shows a method for copying from a volume diffuser into photoresist using prism coupling.

A method of forming a structure like that of FIG. 7 from a volume hologram is shown in FIG. 9. In order to form such a structure we assume that (1) photoresist 22, is in intimate contact with the holographic diffuser 27, (2) beam 21 is incident from outside, passing through the photoresist and into the volume hologram, (3) beam 20 is reflected from the interference planes 28 within the volume hologram back through the photoresist layer and (4) the index of refraction of the volume hologram has a typical value of n=1.5. Thus copying is done with only a single beam.

In order to create beams 20 and 21 at angles of 49.56 degrees and 30.08 degrees (as shown in FIG. 7), these beams, denoted as 29 and 30 in FIG. 9, must have angles of 59.61 degrees and 34.61 degrees respectively in the lower index material 27 (n=1.5). Such beams exist in the volume reflective hologram 27 only if it contains fringe planes tilted at 12.5 degrees as shown in FIG. 9, and whose spacing d=216.28 nm. This assumes that the copy wavelength is 441.6 nm. Light incident normally onto these fringe planes will reconstruct coherently at a wavelength of $\lambda=2nh=2(1.5)(216.28)=648.85$ nm, which is red. This result points out a fundamental characteristic of this type of construction; namely, that copying into a high index material at large incidence angles from a lower index master, requires that the master be red-shifted with respect to the copy. In other words, reconstruction of a blazed surface pattern producing light peaked in the green spectral region requires a master peaked in the red spectral region. Such a volume hologram can be easily made with a conventional holographic setup using red laser light (e.g., a Kr laser at 647 nm or a He—Ne laser at 633 nm) and either red-sensitive photographic emulsion or photopolymer. It is also possible to copy from a photopolymer master diffuser that is already tuned to the green spectral region, provided that certain steps are made to convert the diffuser to the red region. For example, the green Polaroid Imagix diffuser photopolymer can be copied directly into a DuPont 706 photopolymer, using either green laser light at near normal incidence or blue 441.6 nm laser light at a large angle of incidence. The DuPont material can then be tuned to the red region using DuPont CTF color tuning film, which essentially swells the photopolymer to a larger thickness, thereby increasing the spacing between the planes and changing the color from green to red.

Here again the angle for beam 20 in the photoresist is greater than the critical angle (49.56>36.03) and we must resort to coupling by means of a liquid gate. The photoresist plate is placed in a rectangular tank containing an index matching liquid for glass at n≈1.5 (e.g., xylene) that is liquid coupled to an equilateral prism, as shown in FIG. 9.

Variations of the methods disclosed here can result in efficient directional diffusers. For example, with the first type disclosed, uniform angular spreading of the incident beam may be accomplished by a variation of either the period p or the slope $\theta/2$ from sawtooth element to sawtooth element. However, such a procedure may require that the element size p be reduced (for example from 100λ to 10 or 20λ) so as to preserve the smooth visual texture of the diffuser. If the size p is too large, visible portions of the diffuser will not scatter into the observation direction.

Figure 10:
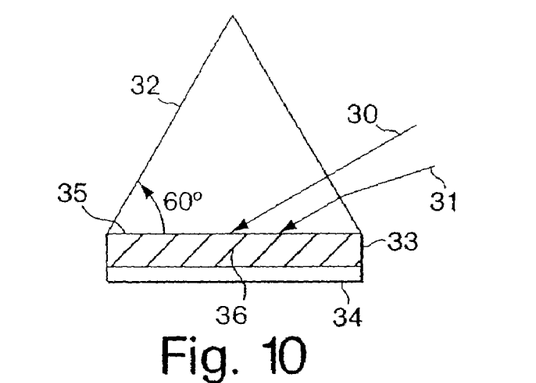
FIG. 10 shows a method for making a deep stepped wedge structure by using a prism coupling.

A variation of the holographic method discussed herein, is the addition of a fine diffusing structure to a coarse wedge structure. This coarse wedge structure is of larger dimensions than that of the methods described in FIGS. 7 and 8, and can be constructed in the following manner, as shown in FIG. 10. Two beams enter the photoresist layer 33 that is coated onto a glass substrate 34 from the same side 35 at an oblique angle, such that the interference fringe structure 36 is coarse and inclined at some angle with respect to the surface. Prism coupling allows for a large degree of obliquity in a manner similar to that shown in FIG. 9.

Figure 11:
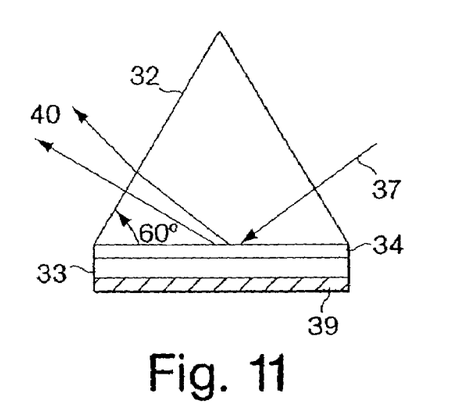
FIG. 11 shows a recording configuration for adding diffuse reflectance to a stepped wedge structure using prism coupling.

A diffuse component can be added in a second exposure step by contacting the photoresist layer 33 to a reflective diffuser 39, as shown in FIG. 11. In this case the incident beam 37 is totally reflected as a diffuse beam 40 that encompasses a range of angles. The contact can be done using either a liquid gate, or by reversing the plate and attaching the diffuser directly to the glass substrate and using a liquid gate between the photoresist and the prism. For this procedure to be effective, the resist should be coated to a several micron thick layer. The first exposure should be done at a laser wavelength for which absorption is large, for example 441.6 nm, so that the amount of reflected light is minimal. The second exposure should be done at a longer, less absorbing wavelength, for example 457.9 or 476 nm, so that the reflected beam is nearly equal in intensity to the incident beam.

Figure 12:
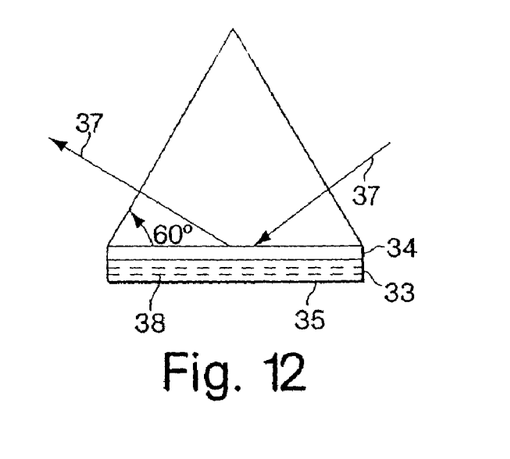
FIG. 12 shows a recording configuration for making a fine interference fringe structure parallel to a recording surface by means of prism coupling.
Figure 13:
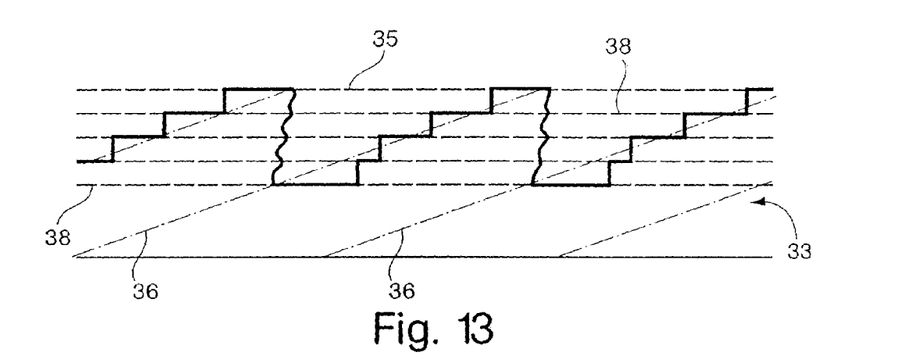
FIG. 13 shows interference fringe planes and the etched surface in photoresist of a deep stepped wedge structure.

An alternate technique adds a fine step structure to the coarse wedge of FIG. 10, in place of the fine diffusing structure. With this technique the second exposure uses two beams that enter the photoresist from opposite sides so that the interference fringe structure is fine and parallel to the surface. This is also done by prism coupling, using a single beam 37 that is totally reflected that interferes with itself, as shown in FIG. 12, with the fine fringe structure designated as 38. For this exposure the photoresist plate is reversed so that the surface 35 faces out. When the photoresist is developed after the composite exposure, the resulting structure is a deep wedge-shaped grating that has a fine stepped grating superimposed onto it (FIG. 13).

Figure 14:
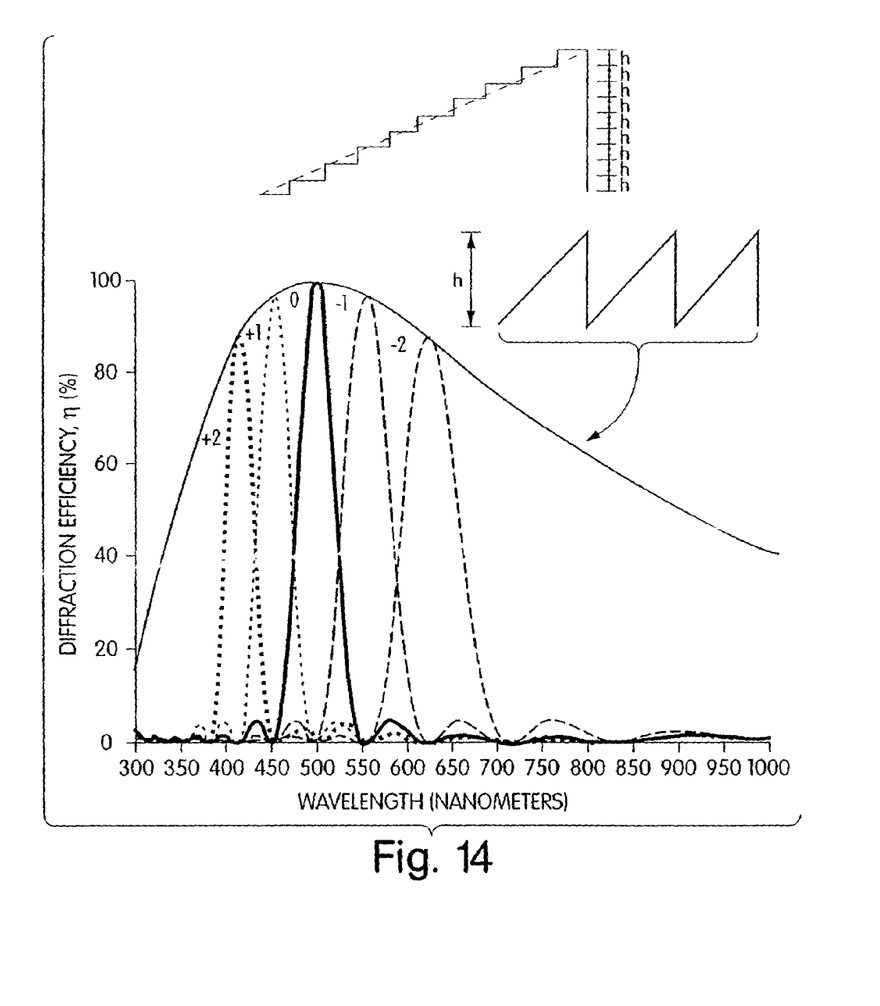
FIG. 14 shows a theoretical diffraction efficiency for a ten-step wedge grating structure with step height=250 nm.

The diffraction efficiency for a ten-level structure is shown in FIG. 14 and includes the spectral distribution for diffracted orders +2, +1, 0, −1, and −2. Also included in this plot is the spectral distribution for a single-step blazed grating, which is identical to FIG. 5. It is clearly evident that the spectral distribution for the single-step shallow blazed grating forms an envelope for the ten-level deep stepped grating. The number of orders that appear under this envelope decreases as the number of levels is reduced, but their individual spectral width increases.

As can be seen from FIG. 14, the diffraction is specularly discrete, allowing only narrow band color components to be observed at any given viewing angle. In order to avoid this often undesirable result, the photoresist can be exposed in narrow adjacent stripes that yield, for example, red, blue, and green light diffracted at the same angle to produce white. The proper angle for light diffracted from the stepped grating structure is determined by the periodicity of the coarse wedge grating, and that periodicity depends, in turn, on the oblique angle that the interference fringe structure makes with respect to the photoresist surface.

Another variation on this method consists of first making a wedge grating structure of large periodicity and adding the step structure or diffuse structure to it holographically. In this configuration, it is similar to the structure shown in FIG. 1c. For the step structure, the procedure consists of coating the wedge structure with a thin, uniform layer of photoresist, which can be done either by dip coating or by spin coating. The coated wedge surface is then immersed in an index-matching liquid gate that is optically contacted to an equilateral glass prism, as described above. The step structure is made by exposing to a totally reflecting beam of laser light that is coupled to a diffuse surface, also described above. With this method many more diffracted orders are obtained than with the totally holographic method described above, due to the much greater depth of the preformed structure compared to that obtained holographically, but with diffuse mixing the diffracted light appears white.

The discussion has focused on devices that uniformly scatter light through a solid angle. But in some applications it may be desirable to achieve non-uniform scattering. One can modify the processes to create blazed diffusers that have a wide range of scattering properties.

Both categories of structures have been described in the foregoing in reference to their scattering properties in one dimension only. That is, the emphasis has been on showing how an incident beam whose obliquity to the surface (i.e., $\theta=30°$) is scattered uniformly throughout an angle $\alpha$, as in FIG. 1. But in the other direction, which follows the coordinate going into the paper in all of the FIGS., the illumination beam 2 (See FIG. 1) is assumed to have no obliquity, but to impinge perpendicular to the surface. In order to obtain a uniform angular diffusion, there is a similar requirement for scattering over an angle of $\alpha$ in this dimension also, albeit without an offset $\theta$. For the first category of diffuser described here, the surface profile into the paper for the surface of FIG. 2 would contain the parabolic component, thus providing a diffuser, each portion of which scatters uniformly throughout a pyramidal solid angle which is offset from the incident illumination by angle $\theta$. Similarly if a beam, which is randomly diffuse throughout a cone of angles, is reconstructed as beam 20 in FIG. 9 from the photopolymer hologram 27, the resulting aluminized diffuser will scatter incoming light throughout a conical solid angle, offset by angle $\theta$.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting.

What is claimed is:

1. A method for making a directional reflector for reflecting an amount of incident light, the directional reflector having a reflective surface, wherein the reflective surface has a periodicity on the order of a wavelength of the incident light and wherein the reflective surface further includes a coarse periodicity having an asymmetrical blazed profile and a fine periodicity, comprising the steps of:

creating the coarse periodicity having an asymmetrical blazed profile by prism coupling and recording into a layer of photoresist using more than one beam, wherein each beam is separated by a small angle and wherein each beam is incident at a large oblique angle; and creating the fine periodicity by reflecting a single beam from the layer of photoresist using prism coupling.

2. The method for making a directional reflector having a reflective surface of claim 1 further comprising the step of adding a diffuse component by having one beam be incident through the photoresist layer onto a predetermined diffuse reflector by means of prism coupling.

3. A method for obtaining white light using a directional reflector having a reflective surface, wherein the reflective surface has a periodicity on the order of a wavelength of incident light and wherein the reflective surface further includes a coarse periodicity having an asymmetrical blazed profile and a fine periodicity, comprising the steps of:

creating the coarse periodicity having an asymmetrical blazed profile by prism coupling and recording into a layer of photoresist using more than one beam, wherein each beam is separated by a small angle and wherein each beam is incident at a large oblique angle;

creating the fine periodicity by reflecting a single beam from the layer of photoresist using prism coupling; and recording the fine periodicity in adjacent narrow parallel stripes, wherein each stripe reflects a different color.

* * * * *